United States Patent
Sendai et al.

(10) Patent No.: US 6,907,311 B2
(45) Date of Patent: Jun. 14, 2005

(54) ELECTRICAL DISCHARGE MACHINING APPARATUS AND ELECTRICAL DISCHARGE MACHINING SIMULATOR

(75) Inventors: Tomoko Sendai, Tokyo (JP); Kenji Iriguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 84 days.

(21) Appl. No.: 10/440,462

(22) Filed: May 19, 2003

(65) Prior Publication Data

US 2003/0220710 A1 Nov. 27, 2003

(30) Foreign Application Priority Data

May 20, 2002  (JP) ........................................ 2002-145049

(51) Int. Cl.[7] ............................................. G05B 15/00
(52) U.S. Cl. ...................... 700/162; 700/182; 700/175; 700/193; 219/69.19
(58) Field of Search ........................ 700/41, 159, 162, 700/173, 179, 175, 180, 182, 193; 219/69.19

(56) References Cited

U.S. PATENT DOCUMENTS 4,980,532 A * 12/1990 Morishita ................ 219/69.13
5,224,048 A    6/1993 Ohba et al.
5,354,961 A * 10/1994 Diot et al. ................ 219/69.13
5,757,649 A *  5/1998 Kato .......................... 700/182

FOREIGN PATENT DOCUMENTS

| JP | 62-130131 | 6/1987 |
| JP | 02-021851 | 1/1990 |
| JP | 03-178731 | 8/1991 |
| JP | 07-319529 | 12/1995 |

* cited by examiner

*Primary Examiner*—Kidest Bahta
(74) *Attorney, Agent, or Firm*—Leydig, Voit & Mayer, Ltd.

(57) ABSTRACT

An electrical discharge machining apparatus includes a simulator. The simulator calculates machining information relating to machining shape at each of several simulated machining depths, when the electrode is moved into a workpiece, until an input machining depth is obtained, based on the shape of the electrode input, the shape of the workpiece, and the machining depth of the workpiece, and determines a shape obtained by subtracting the machining shape from the shape of the workpiece, as a new shape of the workpiece, at each simulated machining depth.

13 Claims, 19 Drawing Sheets

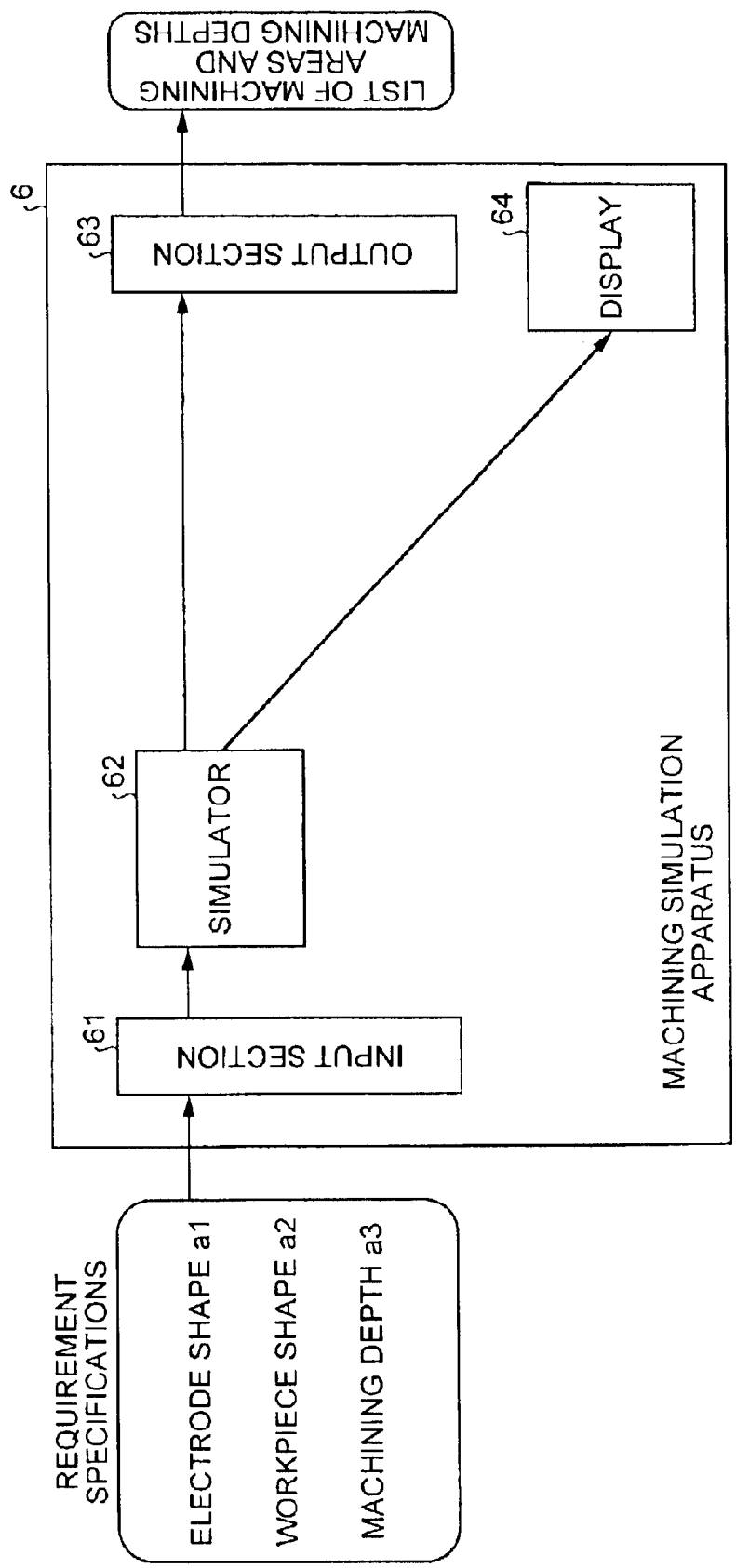

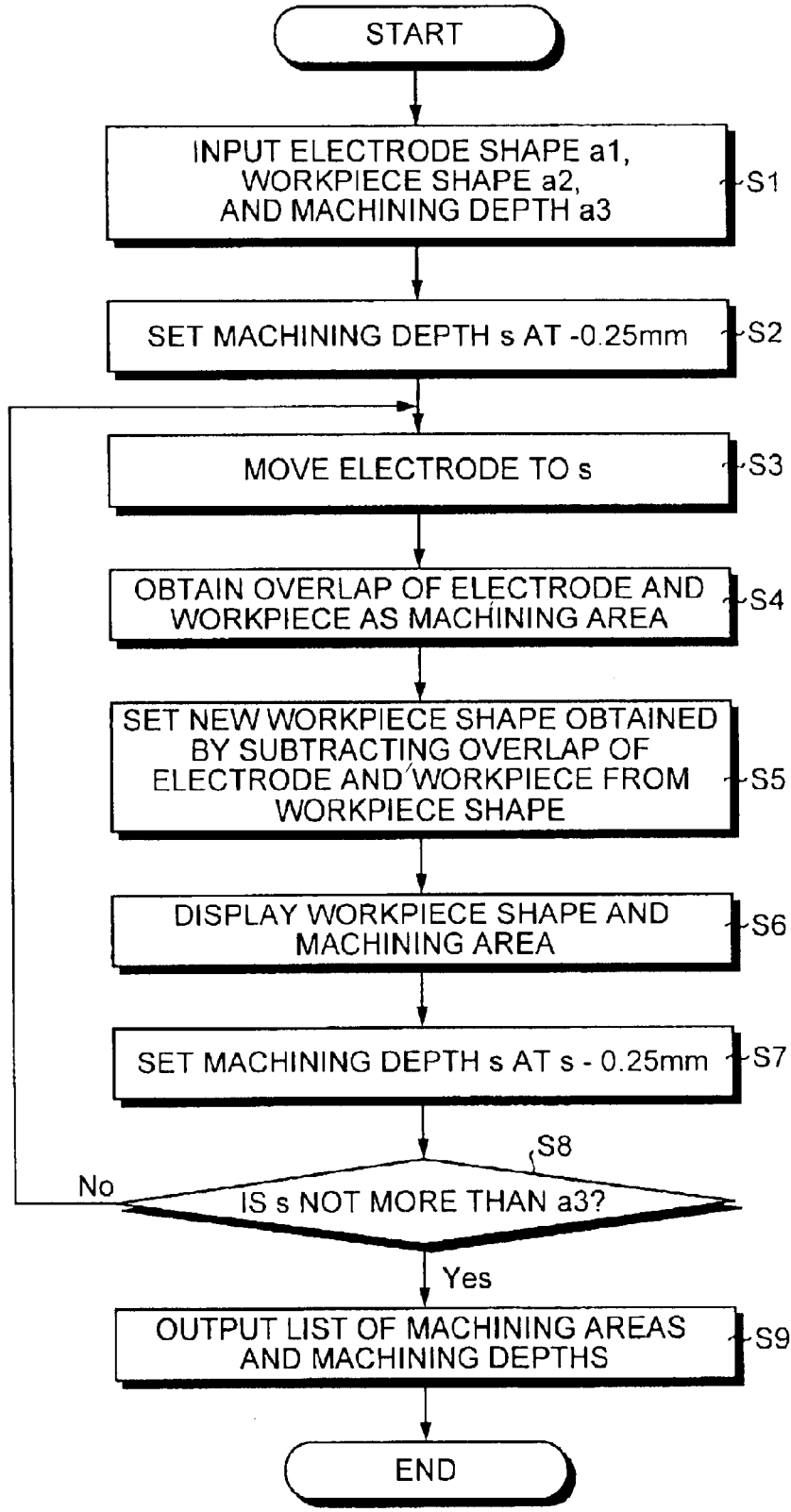

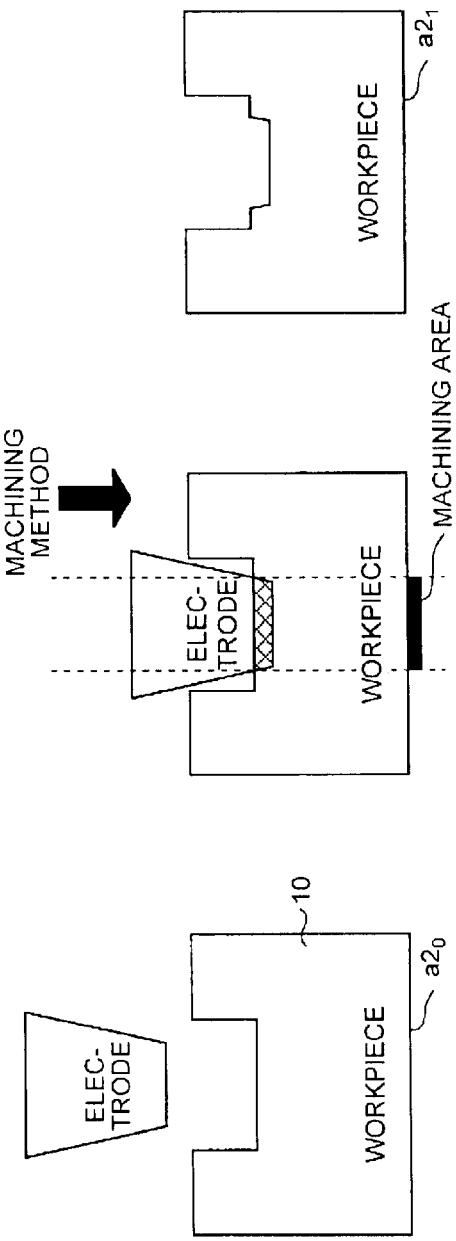

FIG.5A
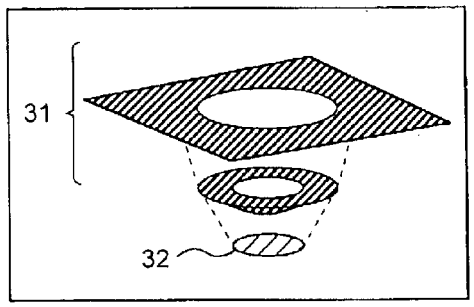
FIG.5B
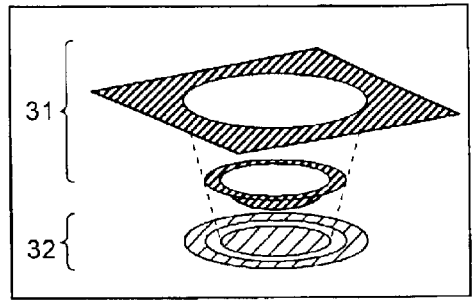
FIG.6
| MACHINING DEPTH | MACHINING AREA |
|---|---|
| -0.25 | 20.48522 |
| -0.5 | 22.76448 |
| -0.75 | 25.36936 |
| -1 | 27.97424 |
| -1.25 | 30.25351 |
| -1.5 | 32.69558 |
| -1.75 | 35.46327 |
| -2 | 38.88217 |
| -2.25 | 41.48705 |
| -2.5 | 45.06876 |

FIG.9

| MACHINING DEPTH | MACHINING VOLUME |
| --- | --- |
| -0.25 | 40.48522 |
| -0.5 | 42.76448 |
| -0.75 | 45.36936 |
| -1 | 47.97424 |
| -1.25 | 50.25351 |
| -1.5 | 52.69558 |
| -1.75 | 55.46327 |
| -2 | 58.88217 |
| -2.25 | 61.48705 |
| -2.5 | 65.06876 |

FIG.15

| MACHINING POSITION | MACHINING VOLUME |
|---|---|
| (x1,y1,z1) | 0.48522 |
| (x2,y2,z2) | 0.76448 |
| (x3,y3,z3) | 0.36936 |
| (x4,y4,z4) | 0.97424 |
| (x5,y5,z5) | 0.25351 |
| (x6,y6,z6) | 0.69558 |
| (x7,y7,z7) | 0.46327 |
| (x8,y8,z8) | 0.88217 |
| (x9,y9,z9) | 0.48705 |
| (x10,y10,z10) | 0.06876 |

FIG.18
CONVENTIONAL ART

| MACHINING DEPTH | SECTIONAL AREA TO BE MACHINED |
|---|---|
| -0.25 | 30.48522 |
| -0.5 | 32.76448 |
| -0.75 | 35.36936 |
| -1 | 37.97424 |
| -1.25 | 40.25351 |
| -1.5 | 42.69558 |
| -1.75 | 45.46327 |
| -2 | 48.88217 |
| -2.25 | 51.48705 |
| -2.5 | 55.06876 |

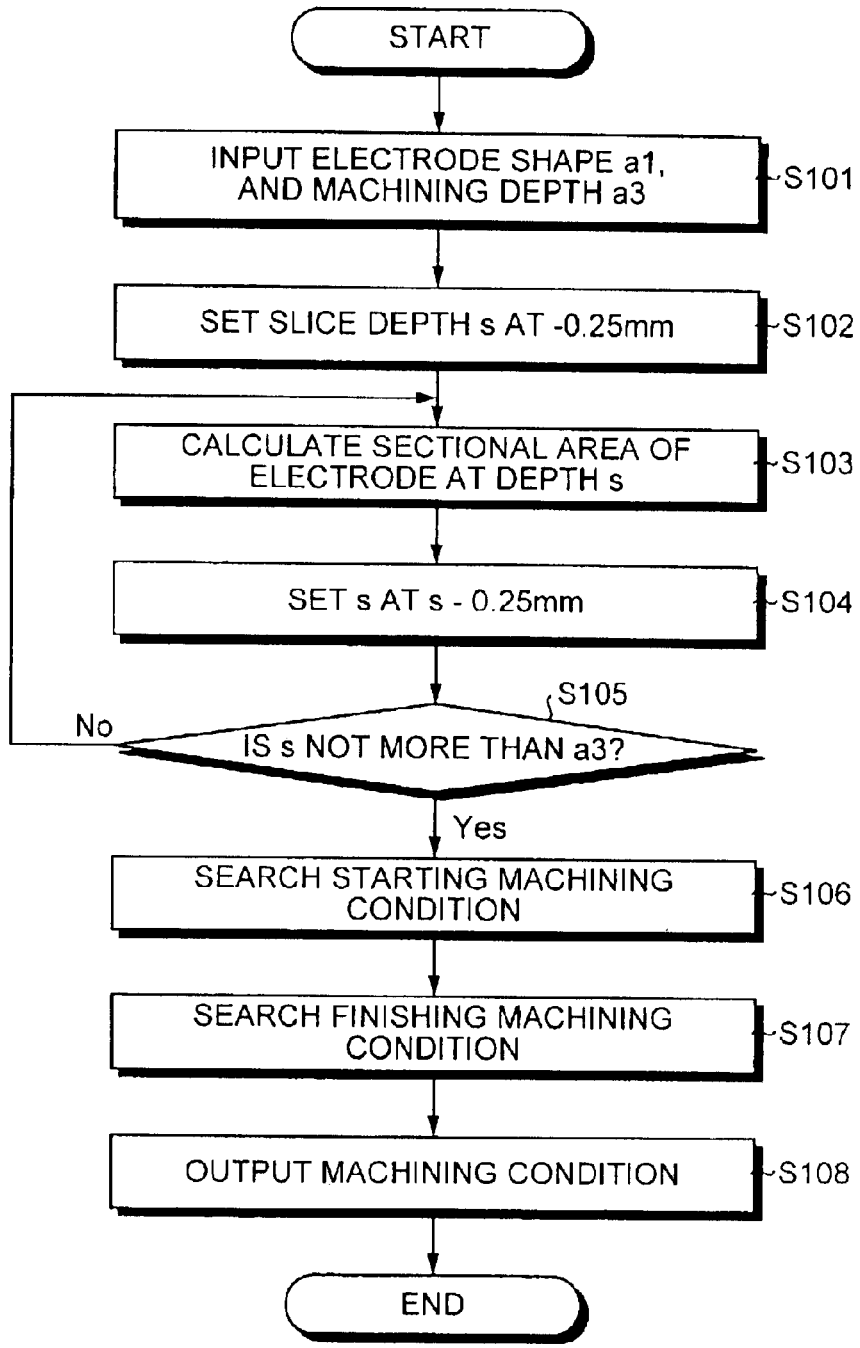

ELECTRICAL DISCHARGE MACHINING APPARATUS AND ELECTRICAL DISCHARGE MACHINING SIMULATOR

BACKGROUND OF THE INVENTION

1) Field of the Invention

The present invention relates to an electric discharge machining apparatus having a function of simulating, before performing the electric discharge machining, the machining state of a workpiece that is worked by a discharge electrode, and an electric discharge machining simulator having the function of simulating.

2) Description of the Related Art

A rough machining condition of the conventional die-sinking electric discharge is determined substantially based on a machining area, in view of electrode wear and critical current density. For example, a machining condition with respect to a narrow machining area requires low energy, and a machining condition with respect to a wide machining area requires high energy. It is preferable that the machining condition is changed as the machining area changes by machining. The machining time is basically calculated by the following expression:

Machining time=machining volume/machining volume per unit time.

From this expression, it becomes possible to estimate machining time accurately if accurate machining volume can be obtained. However, the work piece machined by the die-sinking electric discharge actually has a complicated shape. Therefore, most of the operations for determining the machining condition and estimating the machining time have to depend on the intuition and experience of an operator, except for machining for simple shapes such as a cylinder or a quadratic prism obtained by machining a raw material.

On the other hand, a method is known in which such a dependency on the intuition and experience of the operator is small and the machining condition for more accurate machining is determined. The method includes predicting a sectional area to be machined while confirming the discharge state during machining, and adjusting the machining condition based on the predicted sectional area.

Furthermore, another method is proposed in which the machining condition is determined with a specific sectional area as the machining area. The specific sectional area is an area sliced in an electrode shape or a final metal mold shape with a suitable depth. A conventional electric discharge machining apparatus that determines the machining condition by such a method is explained below. FIG. 16 is a block diagram illustrating one example of a basic configuration of the conventional electric discharge machining apparatus. FIG. 17 is a block diagram illustrating the configuration of the machining condition determining apparatus equipped in the conventional electric discharge machining apparatus shown in FIG. 16. In FIG. 16, the electric discharge machining apparatus 100 includes: a machining tank 5 in which a workpiece 10 is arranged in a machining fluid 11; a machining unit 2 having a tool electrode arranged opposite to the workpiece 10; a power supply 3 that supplies a voltage between the tool electrode and the workpiece 10; a machining condition determining apparatus 7 that determines the machining condition of the workpiece 10; and a numerical control unit 4 that controls a motor (not shown) fitted to the machining unit 2 and the machining tank 5, based on the determined machining condition.

In FIG. 17, the machining condition determining apparatus 7 includes: an input section 71 that receives requirement specifications from a user; an electrode sectional area calculator 72 that calculates the sectional area of the tool electrode with an optional interval; an electrode sectional area storage 73 that stores the sectional area data of the calculated by the electrode sectional area calculator 72; a basic machining conditions storage 75 that stores basic machining conditions; a machining condition search section 74 that searches a machining condition suitable for the sectional area of the electrode, from machining conditions stored in the basic machining conditions storage 75; and an output section 76 that outputs the searched machining condition.

FIG. 18 illustrates a data structure stored in the electrode sectional area memory 73. As shown in this figure, the electrode sectional area memory 73 stores data rows in which the machining depth and the sectional area of the electrode are stored in pairs. In FIG. 18, "machining depth" represents a distance from the bottom face of the electrode in the height direction, and "sectional area to be machined" represents a sectional area to be machined by the electrode at the machining depth.

The operation of the conventional electric discharge machining apparatus 100 having such a configuration will be explained in detail below with reference to the flowchart shown in FIG. 19. First, a user of the electric discharge machining apparatus 100 inputs requirement specifications of an electrode shape a1 and machining depth a3 by the input section 71, according to specifications required for the workpiece 10 (step S101).

When receiving the requirement specifications from the input section 71, the electrode sectional area calculator 72 sets a slice depth s at −0.25 mm, where the slice depth s is the slice depth from the bottom face of the electrode shape a1 (step S102). The electrode sectional area calculator 72 calculates the sectional area of the electrode at the position of this slice depth s, and stores the sectional area of the electrode in the electrode sectional area storage 73 (step S103). Thereafter, the electrode sectional area calculator 72 sets the slice depth s at s −0.25 mm (that is, −0.50 mm) (step S104), and judges whether this slice depth s is not more than the machining depth a3 set at step S101 (step S105).

The electrode sectional area calculator 72 repetitively executes the process of from step S103 to step S104, until the slice depth s becomes not more than the machining depth a3. In other words, the electrode sectional area calculator 72 stores the sectional area data of the electrode for every 0.25 mm from the bottom face of the electrode shape a1 in the electrode sectional area storage 73, until the slice depth s becomes the machining depth a3.

Thereafter, when the slice depth s is not more than the machining depth a3 (step S105, Yes), the machining condition search section 74 searches a starting machining condition and a finishing machining condition at each depth from the sectional area data of the electrode in the electrode sectional area memory 73 (steps S106 and S107), and outputs the searched machining conditions to the output section 76 (step S108).

The numerical control unit 4 executes machining of the workpiece 10, by controlling the power supply 3 and the motor (not shown) fitted to the machining unit 2 and the machining tank 5.

In the actual electric discharge machining, however, as shown in FIG. 20A, a workpiece 10a having a prepared hole formed in the previous step, such as cuttings is to be machined, in some cases. As shown in FIG. 20B, in some cases, the workpiece 10 is machined only by a part of the electrode. In these cases, since the sectional area of the electrode shape or the final metal mold shape does not coincide with the machining area, an adequate machining condition is not selected. Further, since the conventional electric discharge machining apparatus 100 does not have a unit that confirms the workpiece before machining, there is a problem in that, for example, when the size of the electrode is not appropriate, or the machining depth is erroneously set, an existence of the error cannot be found until machining is finished.

SUMMARY OF THE INVENTION

It is an object of the present invention to solve at least the problems in the conventional technology.

The electric discharge machining apparatus according to one aspect of the present invention comprises: a machining tank in which a workpiece is arranged; a machining unit that has an electrode for performing electric discharge machining of the workpiece; a power supply unit that supplies a voltage between the electrode and the workpiece; a numerical control unit that controls the machining unit and the machining tank, according to a machining program for performing electric discharge machining of the workpiece; an input unit to input a shape of the electrode, a shape of the workpiece, and a machining depth that represents a depth until where the workpiece is to be machined; a simulation unit that calculates machining information relating to the machining shape at each simulated machining depth, when the workpiece is machined with the electrode for a predetermined depth, until the input machining depth is obtained, based on the shape of the electrode, the shape of the workpiece, and the machining depth of the workpiece, and sets a shape obtained by subtracting the simulated machining shape from the shape of the workpiece as a new shape of the workpiece at each simulated machining depth; and an output unit that outputs a list of data rows each having the simulated machining depth and the machining information corresponding thereto.

The electric discharge machining apparatus according to another aspect of the present invention comprises: a machining tank in which a workpiece is arranged; a machining unit that has an electrode for performing electric discharge machining of the workpiece; a power supply unit that supplies a voltage between the electrode and the workpiece; a numerical control unit that controls the machining unit and the machining tank, according to a machining program for performing electric discharge machining of the workpiece; an input unit to input a shape of the electrode, a shape of the workpiece, and data relating to the machining program; a simulation unit that calculates machining information relating to each simulated machining shape of the workpiece, when the workpiece is machined with the electrode according to the machining program, based on the shape of the electrode, the shape of the workpiece, and the machining program, and sets a shape obtained by subtracting the simulated machining shape from the shape of the workpiece as a new shape of the workpiece at each electrode position; and an output unit that outputs a list of data rows each having the electrode position and machining information corresponding thereto.

The electric discharge machining simulator according to still another aspect of the present invention comprises: an input unit to input a shape of a machining electrode, a shape of a workpiece to be machined, and a machining depth to which the workpiece is to be machined by the machining electrode; a simulation unit that calculates machining information relating to the machining shape at each simulated machining depth, when the workpiece is machined with the electrode for a predetermined depth, until the input machining depth is obtained, based on the shape of the electrode, the shape of the workpiece, and the machining depth of the workpiece, and sets a shape obtained by subtracting the simulated machining shape from the shape of the workpiece as a new shape of the workpiece at each simulated machining depth; and an output unit that outputs a list of data rows each having the simulated machining depth and the machining information corresponding thereto.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 2 is a block diagram illustrating a first embodiment of the configuration of a machining simulation apparatus of the present invention;

FIG. 3 is a flowchart of the operation of the machining simulation apparatus according to the first embodiment;

FIGS. 4A to 4E illustrate a change in a workpiece shape and a machining area, with progress of machining;

FIGS. 5A and 5B illustrate one example of a state in which a workpiece shape and machining area are simulation-displayed in a display;

FIG. 6 illustrates one example of a list consisting of data rows each having a machining depth and a machining area;

FIG. 9 illustrates one example of a list consisting of data rows each having a machining depth and a machining volume;

FIG. 15 illustrates one example of a list consisting of data rows each having a machining position and a machining volume;

FIG. 18 illustrates a data structure stored in the electrode sectional area storage of the conventional electric discharge machining apparatus;

FIG. 19 is a flowchart illustrating the operation of the conventional machining condition determining apparatus.

DETAILED DESCRIPTION

Exemplary embodiments of the electric discharge machining apparatus according to the present invention will be explained in detail below with reference to the accompanying drawings.

Figure 1:
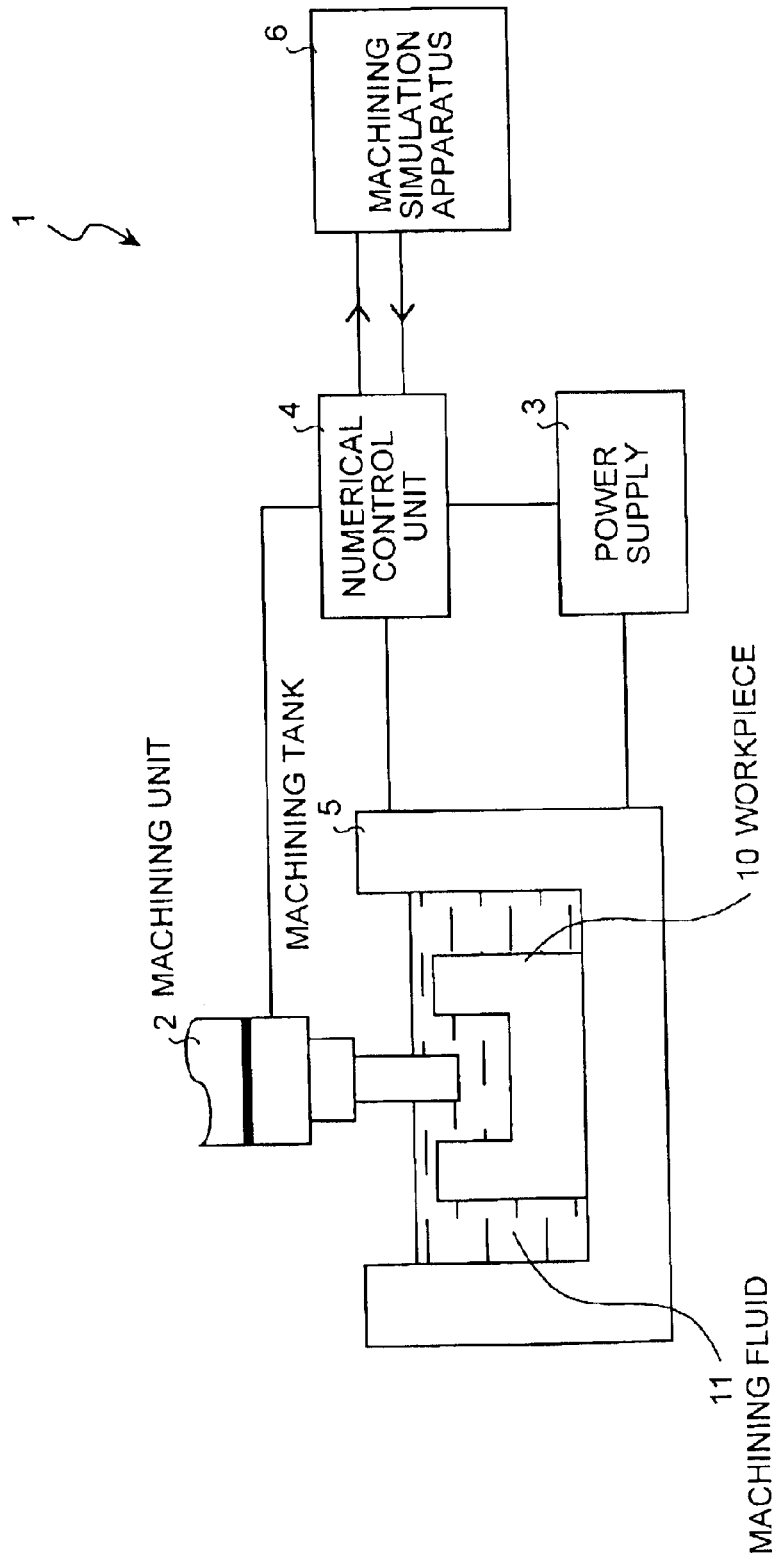
FIG. 1 is a schematic block diagram illustrating the configuration of an electric discharge machining apparatus according to the present invention.

FIG. 1 is a block diagram illustrating the configuration of the electric discharge machining apparatus according to a first embodiment of the present invention. The electric discharge machining apparatus 1 includes the machining tank 5, the machining unit 2, the power supply 3, and the numerical control unit 4, in the same way as the conventional one shown in FIG. 16.

Figure 16:
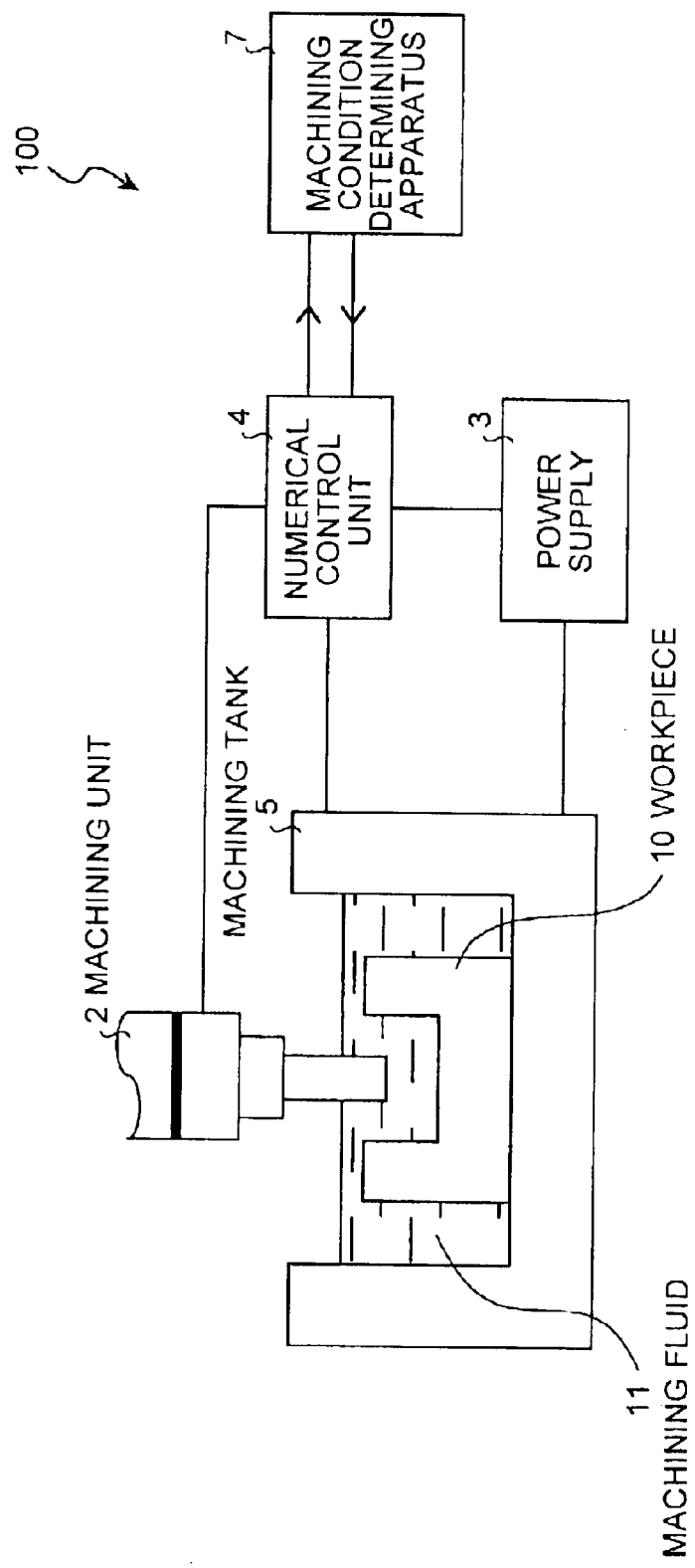
FIG. 16 is a block diagram illustrating one example of a basic configuration of the conventional electric discharge machining apparatus.
Figure 17:
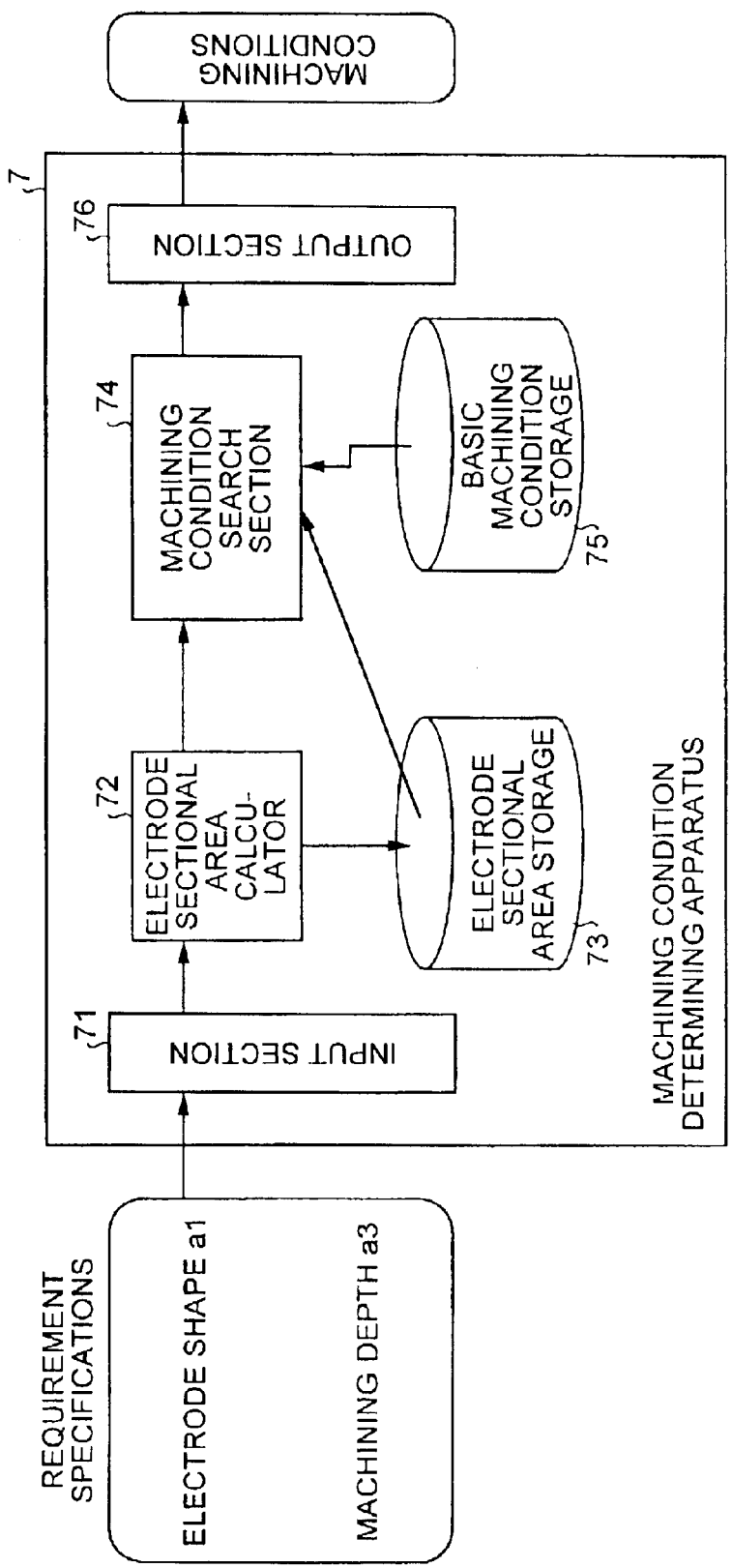
FIG. 17 a block diagram illustrating the configuration of the machining condition determining apparatus equipped in the conventional electric discharge machining apparatus shown in FIG. 16.
Figure 20A:
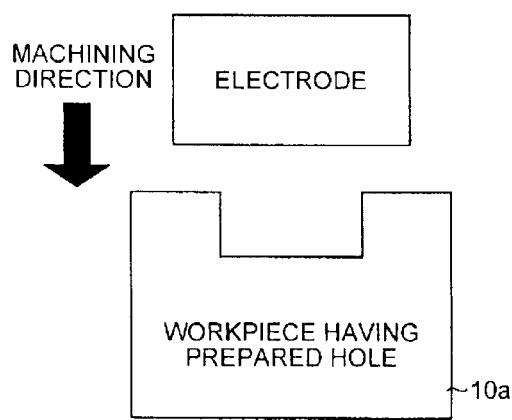
FIGS. 20A and 20B schematically illustrate examples of structure and positions of a workpiece and an electrode.
Figure 20B:
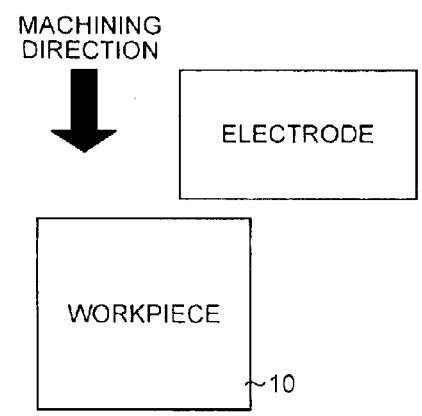

This electric discharge machining apparatus 1 is different from the conventional one shown in FIG. 16 in that a machining simulation apparatus 6 is provided in place of the machining condition determining apparatus 7, and the numerical control unit 4 controls the motor based on the simulation result of the machining simulation apparatus 6.

FIG. 2 is a block diagram illustrating the configuration of the machining simulation apparatus 6. The machining simulation apparatus 6 includes: an input section 61 that receives requirement specifications, such as an electric shape, a work shape, machining depth, and the like, from a user; a simulator 62 that performs machining simulation to calculate the machining area; a display 64 that displays the machining simulation operation and a list of data rows each having machining depth and machining area that are calculated by the simulator 62; and an output section 63 that outputs the list. The machining simulation apparatus 6 is realized by, for example, a personal computer having an image processing function.

The operation of the electric discharge machining apparatus 1 having the above configuration will be explained below in detail with reference to the flowchart shown in FIG. 3. It is assumed that the height direction of the machining unit 2 is the direction of the Z axis, and a plane perpendicular to this Z axis is an XY plane. Further, a shape of the workpiece 10 is referred to as "workpiece shape".

First, a user inputs the requirement specifications of an electrode shape a1, a workpiece shape a2, and a machining depth a3 from the input section 61 (step S1). The electrode shape a1 and workpiece shape a2 is, for example, selected from data of various electrode shapes and workpiece shapes stored in database (not shown). The machining depth a3 is, for example, input as a numerical value by a keyboard. When an electrode shape a1 and a workpiece shape a2 do not exist in the database, it is necessary to newly register these shapes in the database. In the following explanation, it is assumed that the machining depth a3 denotes a negative value.

When receiving the requirement specifications from the input section 61, the simulator 62 sets the machining depth s at, for example, −0.25 mm (step S2). The machining depth s is expressed in which the downward direction along the Z axis from the uppermost part of the workpiece shape a2 is a negative axis. In other words, the uppermost part of the workpiece shape a2 corresponds to the maximum value in the Z axis.

The simulator 62 simulates a machining state so that the electrode having the electrode shape a1 has been moved toward the workpiece having the workpiece shape a2 up to the machining depth s=−0.25 mm (step S3). At this time, the simulator 62 determines overlap of the electrode shape a1 and the workpiece shape a2, and obtains the value of an area of a portion of the overlap parallel to the XY plane, as a machining area at the machining depth s=−0.25 mm (step S4). Then, the simulator 62 sets the workpiece shape a2 at new one obtained by subtracting the overlap from the workpiece shape a2 (step S5). The workpiece shape and the machining area at this machining depth s are temporarily stored, and the machining state of the new work shape a2 at the machining depth s=−0.25 mm and the machining area are simulated and displayed (step S6) in the display 64. This display 64 may display not only the simulation of the machining condition of the workpiece shape a2 and the machining area, but also a value of the machining area at the machining depth s.

After that, the simulator 62 sets a value obtained by adding −0.25 mm to the machining depth s as a new machining depth s. In other words, s −0.25 mm (that is, −0.50 mm) is set as the new machining depth s (step S7). The simulator 62 then judges whether the updated machining depth s is not more than the machining depth a3 input by the user at step S1 (step S8). If the new machining depth s is larger than the machining depth a3 (step S8, No), the process beginning at step S3 is repetitively executed until the machining depth s is the machining depth a3.

FIGS. 4A to 4E are a front sectional view illustrating the relation between the electrode and the workpiece with the progress of machining, for explaining a change in the workpiece shape a2 and the machining area with the progress of machining. FIGS. 4A to 4E illustrate the state when the workpiece 10 having a circle prepared hole formed therein is machined by an electrode having a taper. FIG. 4A illustrates the electrode and the workpiece 10 before simulation, and the workpiece 10 is in an initial stage and has a workpiece shape $a2_0$. As explained at step S3, FIG. 4B illustrates the next state in which the electrode is moved to the position of the machining depth s=−0.25 mm. The hatching area in FIG. 4B illustrates the overlap of the electrode and the workpiece 10. As shown in FIG. 4C, an object obtained by subtracting this overlap from the workpiece shape $a2_0$ is designated as a new workpiece shape $a2_1$. In FIG. 4B, the machining area corresponds to the portion indicated by a thick line at the bottom of the workpiece 10, and the simulator 62 calculates the area of this portion.

FIG. 4D illustrates a state in which the electrode is moved downward along the Z axis by further 0.25 mm toward the workpiece 10 having the new workpiece shape $a2_1$. In FIG. 4D, the hatching area illustrates the overlap of the electrode and the workpiece 10. The portion indicated by a thick line at the bottom of the workpiece 10 in FIG. 4D indicates the machining area, and the simulator 62 calculates the area of this portion. FIG. 4E illustrates a new workpiece shape $a2_2$ obtained by subtracting this overlap from the workpiece shape $a2_1$.

In the first embodiment, every time the machining area is calculated at each machining depth s, the simulation situation is displayed in the display 64 such as a cathode ray tube (CRT) or a liquid crystal display (LCD). FIGS. 5A and 5B illustrate one example of the simulation display of a three-dimensional machining shape. From FIG. 5A to FIG. 5B, the workpiece shape 31 deforms with the progress of the machining state, and the machining area 32 projected to the bottom of the workpiece 10 gradually enlarges.

When the machining depth s reaches the machining depth a3 set at step S1 (step S8, Yes) in the simulation by the simulator 62, as shown in FIG. 6, a list is output to the display 64 (step S9). Precisely, the list consists of data rows each having the machining depth and the machining area that have been temporarily stored in the process concerning step S5. The user judges whether the requirement specifications are appropriate based on the list displayed.

Thereafter, when the list (that is, the requirement specifications) is appropriate, the list is output from the output section 63 to the numerical control unit 4. The numerical control unit 4 controls the machining unit 2, the machining tank 5, and the power supply 3, based on the list. As a result, the workpiece 10 is machined into a desired shape.

Though not shown in FIG. 1, the electric discharge machining apparatus 1 may further include a machining time estimating apparatus. The machining time estimating apparatus calculates the machining time, using the data rows of the list output from the machining simulation apparatus 6, and a machining volume per unit time held by the machining time estimating apparatus itself. For example, the machining time can be obtained by: obtaining a machining volume by multiplying the machining area of the data rows by an appropriate height; and then, dividing this machining volume by a machining volume per unit time. This calculated machining time can be displayed in the display 64. The machining volume per unit time is different depending on the electrode, the workpiece 10, and the power applied, and is obtained beforehand by experiments.

According to the first embodiment, since the simulation function for calculating the machining area with the progress of machining is provided, accurate machining area can be calculated, regardless of the shape of the electrode and the workpiece. Further, there is the effect that the progress of machining of the workpiece can be confirmed before actual machining. That is, even if the size of the electrode is not appropriate, or the machining depth is erroneously set, appropriate machining condition can be selected before executing machining. In the above explanation, an example in which the machining depth is −0.25 mm is explained as a representative example of numerical values, but the present invention is not limited to this numerical value, and needless to say, other numerical values may be used.

Figure 7:
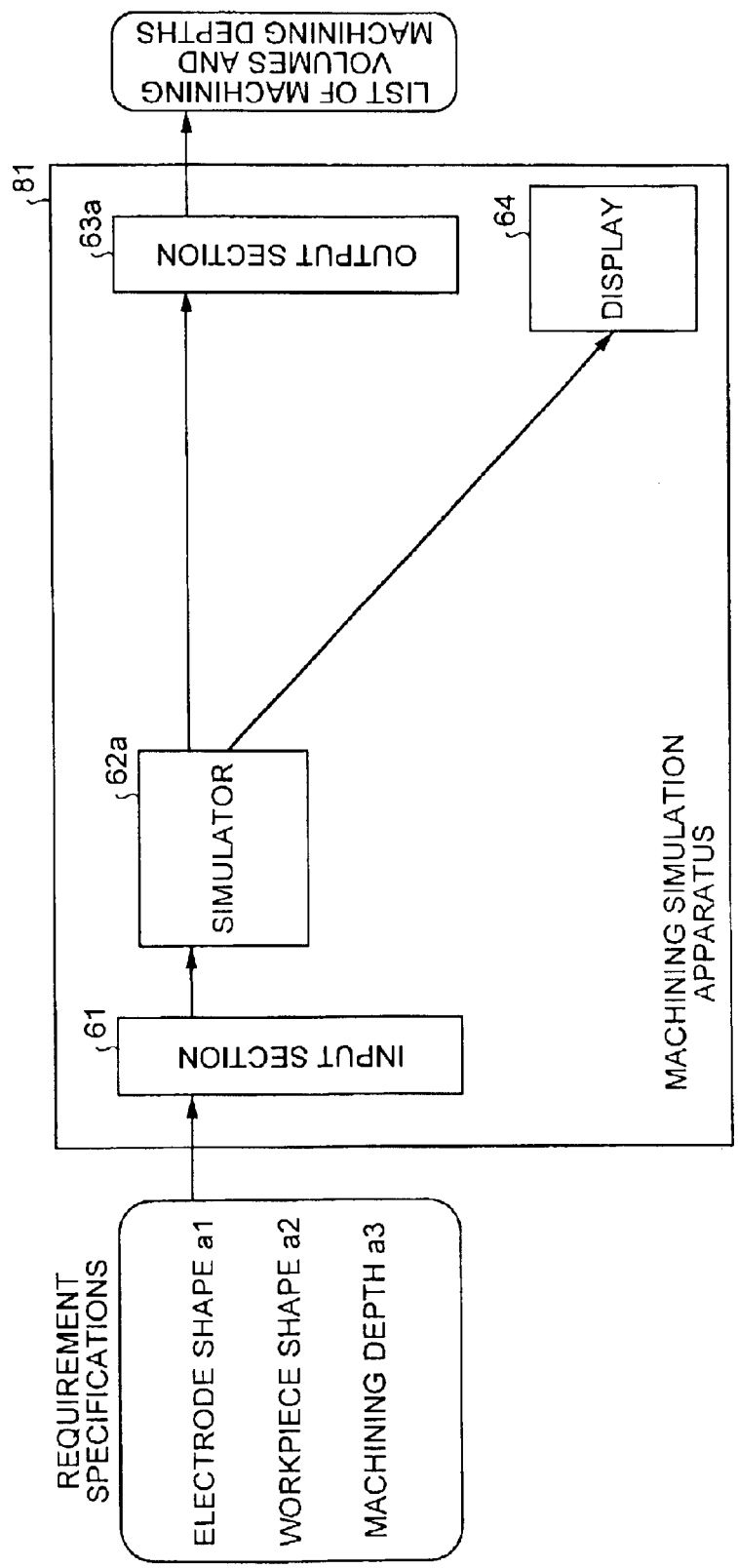
FIG. 7 is a block diagram illustrating a second embodiment of the configuration of the machining simulation apparatus of the present invention.

FIG. 7 is a block diagram illustrating a second embodiment of the configuration of the machining simulation apparatus 81 constituting the electric discharge machining apparatus 1 according to the present invention. The same constituent as that in the first embodiment is denoted by the same reference sign, and the explanation thereof is omitted. The simulator 62a has a function of performing machining simulation and calculating the machining volume. The output section 63a has a function of outputting a list of data rows each having the machining depth and the machining volume that are calculated by the simulator 62a.

Figure 8:
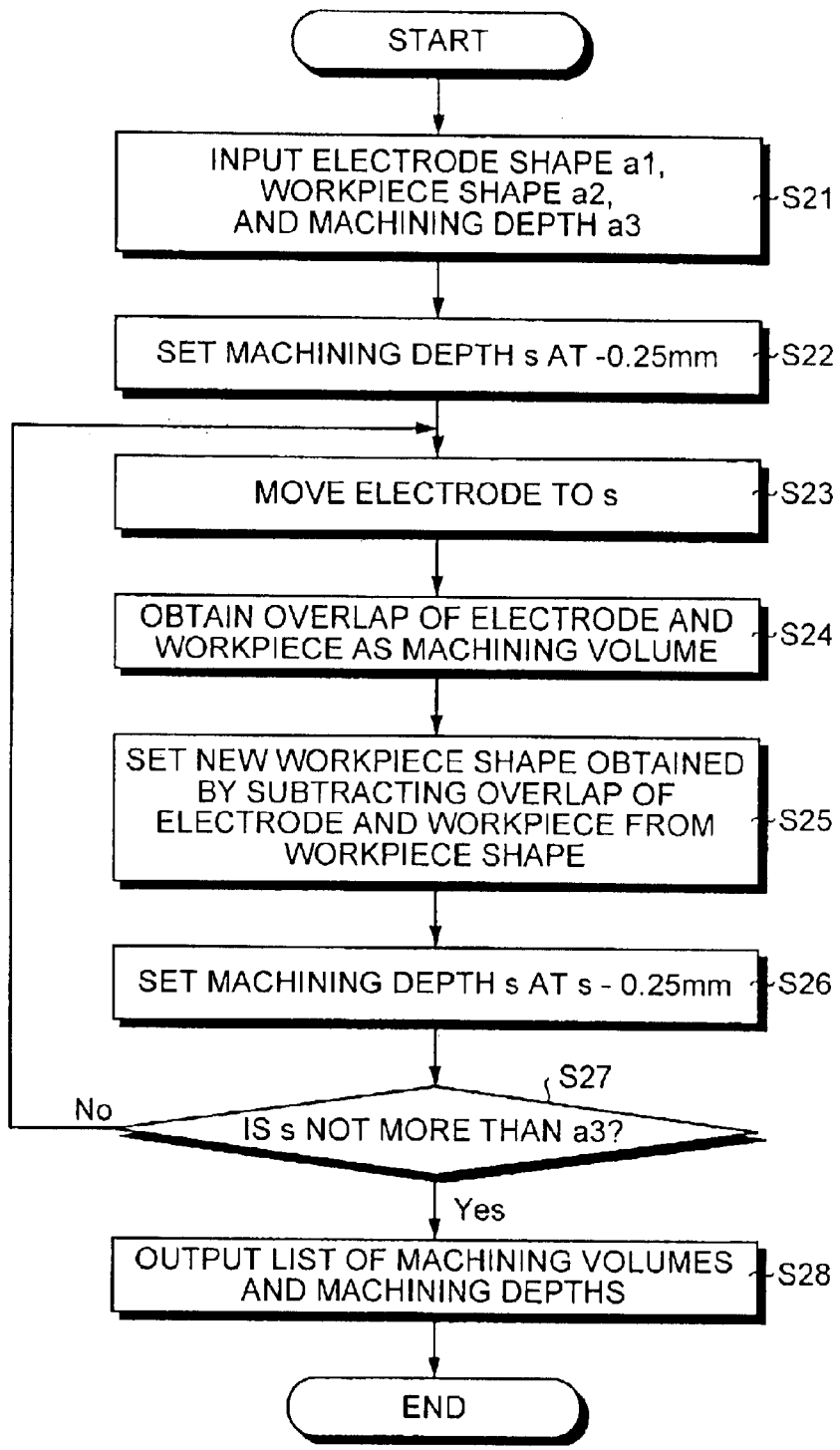
FIG. 8 is a flowchart of the operation of the machining simulation apparatus according to the second embodiment.

The operation of the electric discharge machining apparatus 1 that has the machining simulation apparatus 81 including such a configuration will be explained in detail with reference to the flowchart shown in FIG. 8.

First, a user inputs the requirement specifications of an electrode shape a1, a workpiece shape a2, and a machining depth a3 from the input section 61 (step S21). When receiving the requirement specifications from the input section 61, the simulator 62a sets the machining depth s at, for example, −0.25 mm (step S22). The machining depth s is expressed in which the downward direction along the Z axis from the uppermost part of the workpiece shape a2 is a negative axis.

The simulator 62a simulates a machining state so that the electrode having the electrode shape a1 has been moved toward the workpiece having the workpiece shape a2 up to the machining depth s=−0.25 mm (step S23). At this time, the simulator 62a determines overlap of the electrode shape a1 and the workpiece shape a2, and obtains the value of the volume of the overlap as a machining volume at a machining depth s=−0.25 mm (step S24). Then, the simulator 62a sets the workpiece shape a2 at new one obtained by subtracting the overlap from the work shape a2 (step S25). The workpiece shape a2 and the machining volume at this machining depth s are temporarily stored. In the same way as the first embodiment, the new workpiece shape a2 and the value of the machining volume at the machining depth s may be displayed in the display 64.

After that, the simulator 62a sets a value obtained by adding −0.25 mm to the machining depth s as a new machining depth s. In other words, s −0.25 mm (that is, −0.50 mm) is set as the new machining depth s (step S26). The simulator 62a then judges whether the updated machining depth s is not more than the machining depth a3 input by the user at step S21 (step S27). If the new machining depth s is larger than the machining depth a3 (step S27, No), the process beginning at step S23 is repetitively executed until the machining depth s is the machining depth a3 input at step S21.

When the machining depth s reaches the machining depth a3 set at step S21 (step S27, Yes) in the simulation by the simulator 62a, as shown in FIG. 9, a list is output to the display 64 (step S28). Precisely, the list consists of data rows each having the machining depth and the machining volume that have been temporarily stored in the process concerning step S25. The user judges whether the requirement specifications are appropriate based on the list displayed.

Thereafter, when the list (that is, the requirement specifications) is appropriate, the list is output from the output section 63 to the numerical control unit 4. The numerical control unit 4 controls the machining unit 2, the machining tank 5, and the power supply 3, based on the list. As a result, the workpiece 10 is machined into a desired shape.

As explained in the first embodiment, when the electric discharge machining apparatus 1 further includes the machining time estimating apparatus, the machining time is calculated, using the data rows of the list output from the machining simulation apparatus 81, and a machining volume per unit time determined beforehand. Concretely, the machining time estimating apparatus calculates the machining time at each machining depth, by dividing each machining volume of the list by a machining quantity per unit time relating to the electrode shape a1 stored in the machining time estimating apparatus. This calculated machining time can be displayed in the display 64.

According to the second embodiment, since the simulation function for calculating the machining volume with the progress of machining is provided, accurate machining volume can be calculated, regardless of the shape of the electrode and the workpiece. In the above explanation, an example in which the machining depth is −0.25 mm is explained as a representative example of numerical values, but the present invention is not limited to this numerical value, and needless to say, other numerical values may be used.

Figure 10:
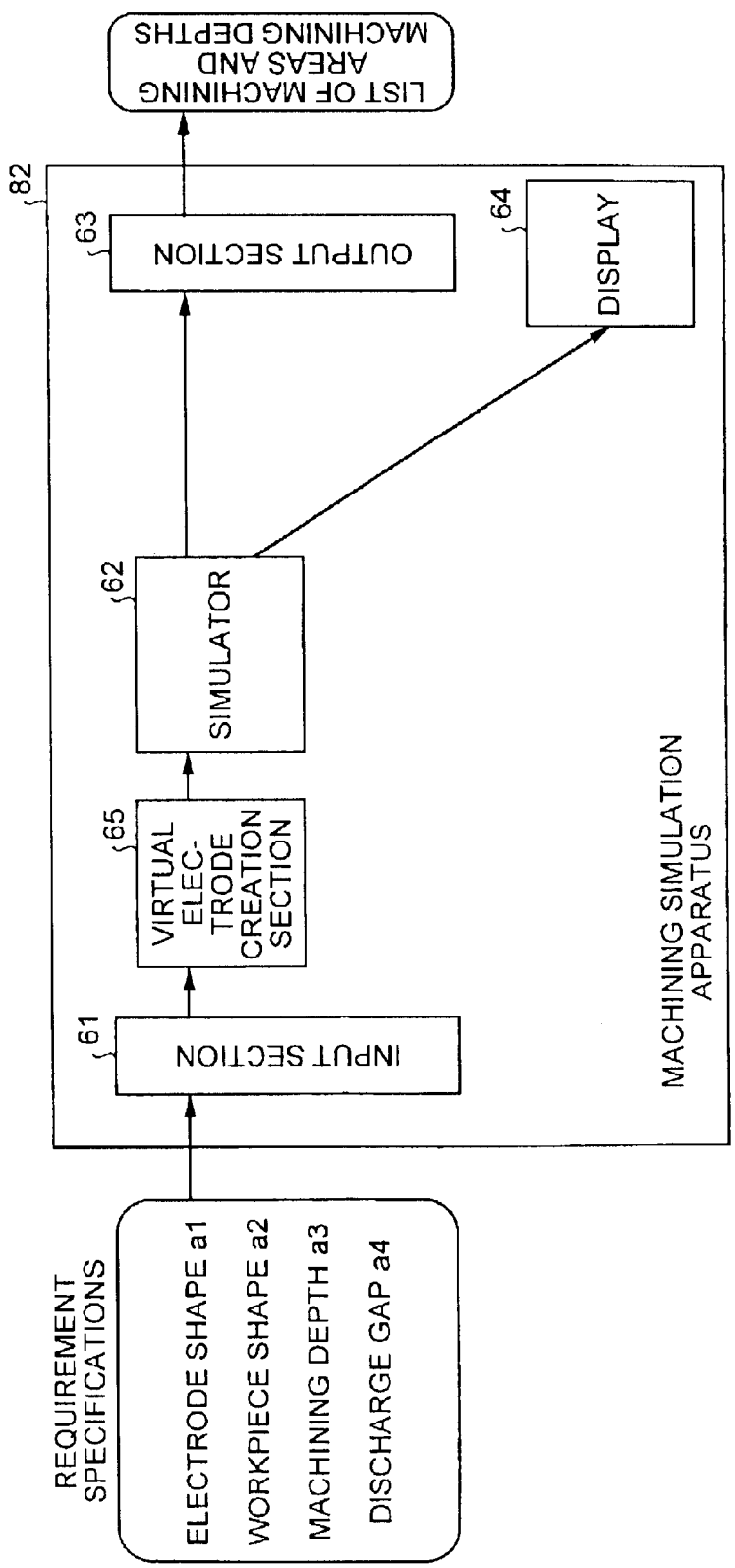
FIG. 10 is a block diagram illustrating a third embodiment of the configuration of the machining simulation apparatus of the present invention.

FIG. 10 is a block diagram illustrating a third embodiment of the configuration of the machining simulation apparatus 82 constituting the electric discharge machining apparatus 1 according to the present invention. The machining simulation apparatus 82 further includes a virtual electrode creation section 65 in addition to the configuration shown in FIG. 2. The virtual electrode creation section 65 creates a virtual electrode shape in which a discharge gap is added to the electrode shape input by the input section 61. The same constituent as that in the first embodiment is denoted by the same reference sign, and the explanation thereof is omitted.

Figure 11:
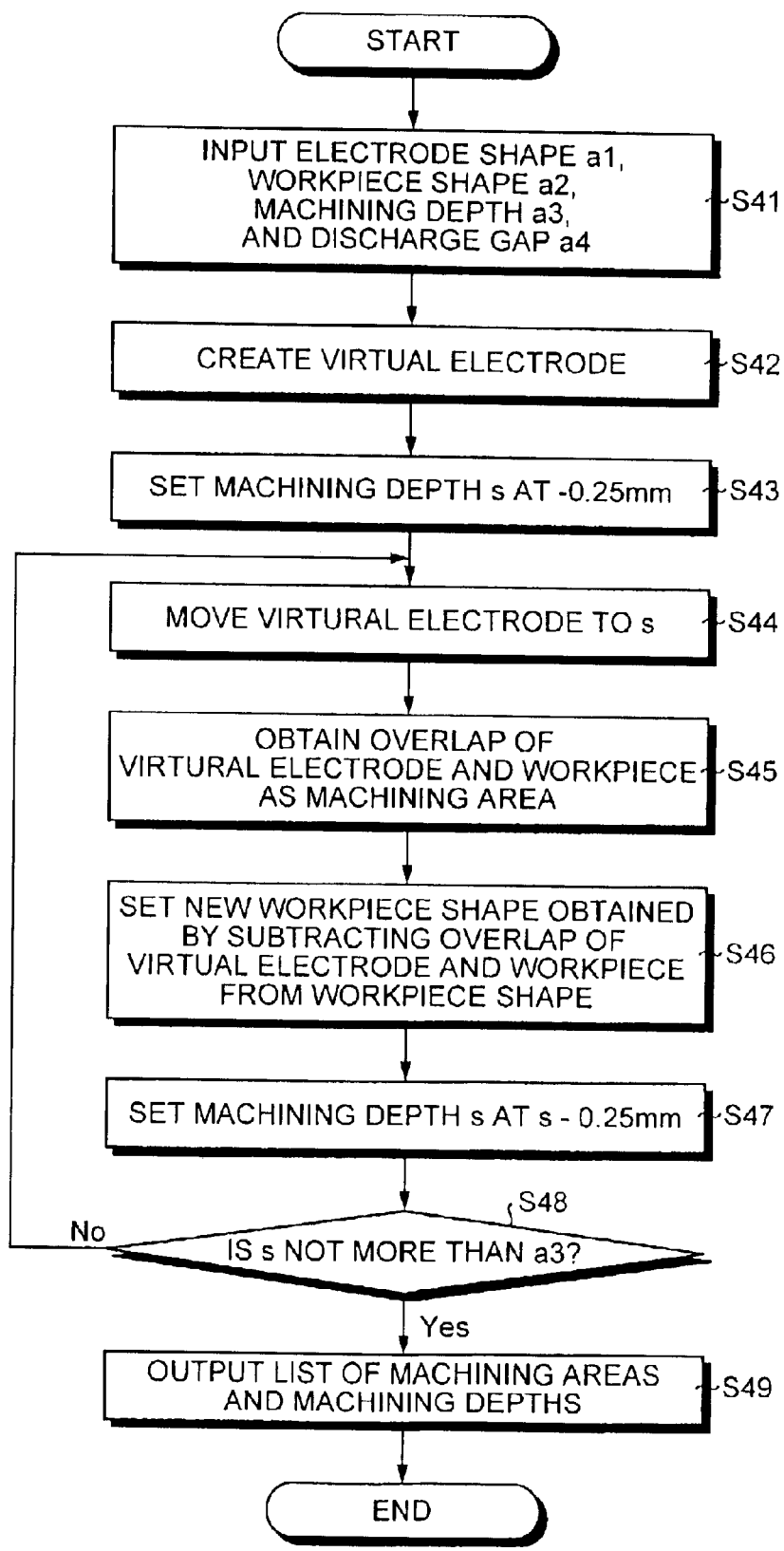
FIG. 11 is a flowchart of the operation processing of the machining simulation apparatus according to the third embodiment.

The operation of the electric discharge machining apparatus 1 that has the machining simulation apparatus 82 including such a configuration will be explained in detail with reference to the flowchart shown in FIG. 11.

Figure 12:
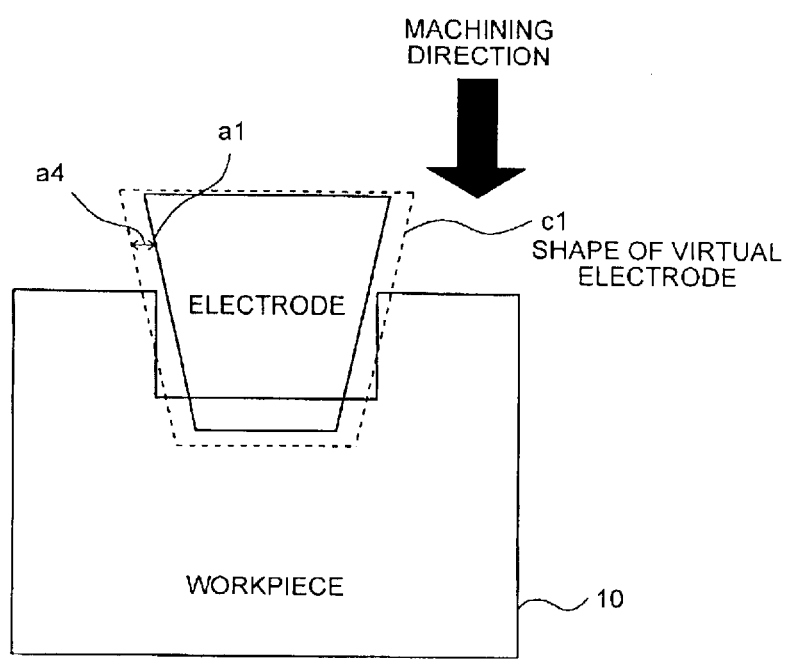
FIG. 12 schematically illustrates a virtual electrode shape in which a discharge gap is added to the electrode shape.

First, a user inputs the requirement specifications of an electrode shape a1, a workpiece shape a2, a machining depth a3, and a discharge gap a4 from the input section 61 (step S41). When receiving the requirement specifications from the input section 61, the virtual electrode creation section 65 creates a virtual electrode shape c1 in which the electrode shape a1 is enlarged by the discharge gap a4 (step S42), and sends it to the simulator 62. FIG. 12 is a front elevation schematically illustrating the relation between the virtual electrode shape c1 and the electrode shape a1. In FIG. 12, a solid line shows the actual electrode shape a1, a dotted line shows the shape c1 of the virtual electrode, and a portion of a difference between the dotted line and the solid line shows the discharge gap a4. As shown in FIG. 12, since the electric discharge machining is non-contact machining, the actual machining position becomes a position away from the electrode face by the discharge gap a4.

When receiving the workpiece shape a2 and the machining depth a3 input from the input section 61, and the virtual electrode shape c1 from the virtual electrode creation section 65, the simulator 62 sets the machining depth s at, for example, −0.25 mm (step S43). The machining depth s is expressed in which the downward direction along the Z axis from the uppermost part of the workpiece shape a2 is a negative axis.

The simulator 62 simulates a machining state so that the electrode having the virtual electrode shape c1 has been moved toward the workpiece shape a2 up to the machining depth s=−0.25 mm (step S44). At this time, the simulator 62 determines overlap of the virtual electrode shape c1 and the workpiece shape a2, and obtains the value of an area of a portion of the overlap parallel to the XY plane, as a machining area at the machining depth s=−0.25 mm (step S45). Then, the simulator 62 sets the workpiece shape a2 at new one obtained by subtracting the overlap from the workpiece shape a2 (step S46). The workpiece shape a2 and the machining area at this machining depth s are temporarily stored. As explained in the first embodiment, the display 64 may display the new workpiece shape a2 and the value of the machining area at the machining depth s.

After that, the simulator 62 sets a value obtained by adding −0.25 mm to the machining depth s as a new machining depth s. In other words, s −0.25 mm (that is, −0.50 mm) is set as the new machining depth s (step S47). The simulator 62 then judges whether the updated machining depth s is not more than the machining depth a3 set at step S41 (step S48). If the new machining depth s is larger than the machining depth a3 (step S48, No), the process beginning at step S44 is repetitively executed until the machining depth s is the machining depth a3 input at step S41.

When the machining depth s reaches the machining depth a3 set at step S41 (step S48, Yes) in the simulation by the simulator 62, as shown in FIG. 6, the list consisting of data rows each having the machining depth and the machining area is output to the display 64 (step S49). The user judges whether the requirement specifications are appropriate based on the list displayed.

Thereafter, when the list (that is, the requirement specifications) is appropriate, the list is output from the output section 63 to the numerical control unit 4. The numerical control unit 4 controls the machining unit 2, the machining tank 5, and the power supply 3, based on the list. As a result, the workpiece 10 is machined into a desired shape.

Also in the third embodiment, the machining time estimating apparatus may be provided in the same way as the first embodiment. In the above explanation, an example of calculating the machining area is exemplified, but the present invention is not limited thereto. When the machining volume is obtained in the same way as the second embodiment, it is also possible to perform simulation by using the virtual electrode shape c1 obtained by adding the discharge gap a4 to the electrode shape a1.

According to the third embodiment, since the simulation function for calculating the machining area with the progress of machining by using the virtual electrode shape obtained by adding a discharge gap to the electrode shape is provided, more accurate machining area can be calculated, conforming to the actual machining, regardless of the shape of the electrode and the workpiece. Further, the progress of machining can be confirmed before actual machining. That is, even if the size of the electrode is not appropriate, or the machining depth is erroneously set, appropriate machining condition can be selected before executing machining, thereby enabling prevention of an input error. In the above explanation, an example in which the machining depth is −0.25 mm is explained as a representative example of numerical values, but the present invention is not limited to this numerical value, and needless to say, other numerical values may be used.

Figure 13:
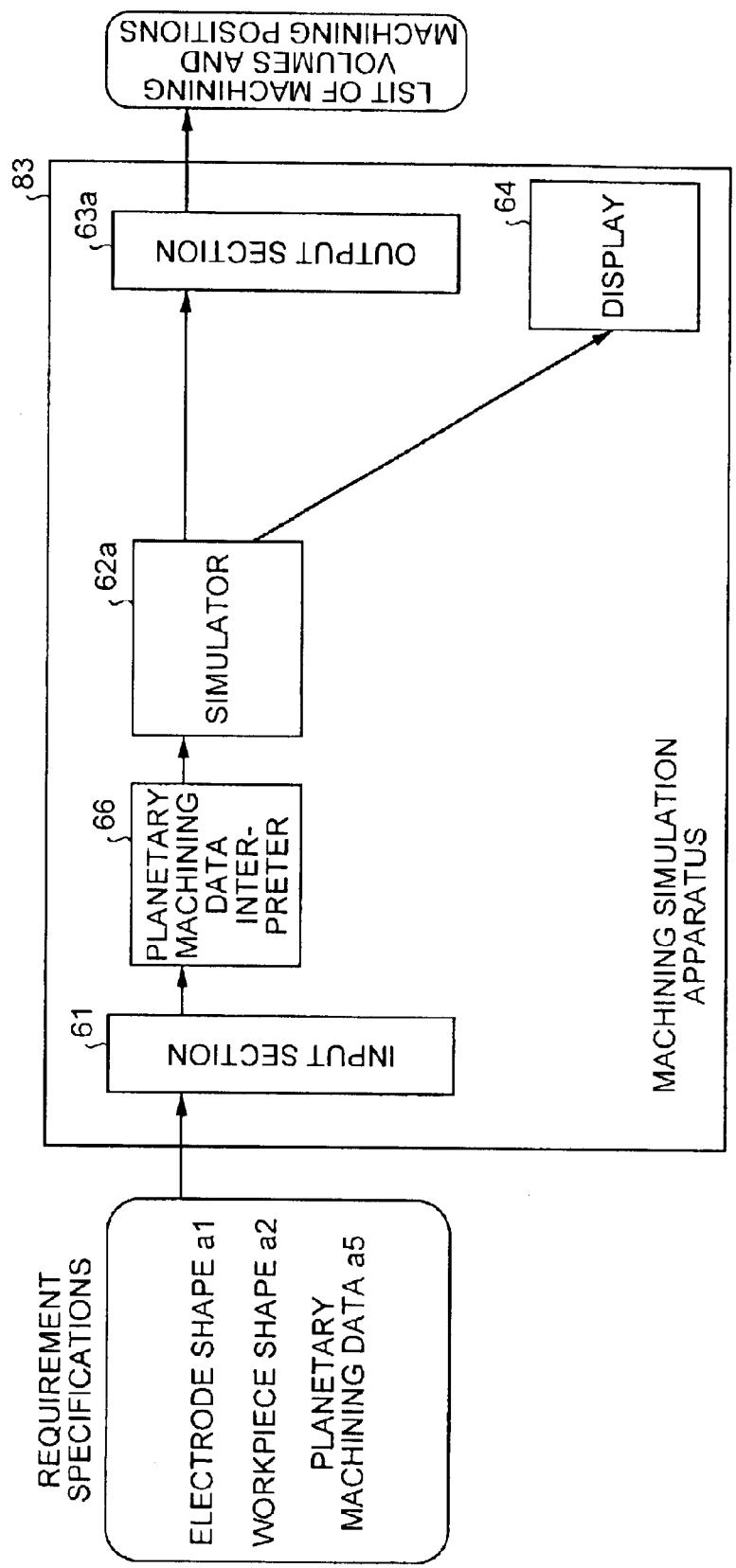
FIG. 13 is a block diagram illustrating a fourth embodiment of the configuration of the machining simulation apparatus of the present invention.

FIG. 13 is a block diagram illustrating a fourth embodiment of the configuration of the machining simulation apparatus 83 constituting the electric discharge machining apparatus 1 according to the present invention. The machining simulation apparatus 83 further includes a planetary machining data interpreter 66 that interprets planetary machining data input by the input section 61, in the configuration shown in FIG. 7. The same constituent as that in the first and second embodiments is denoted by the same reference sign, and the explanation thereof is omitted.

Figure 14:
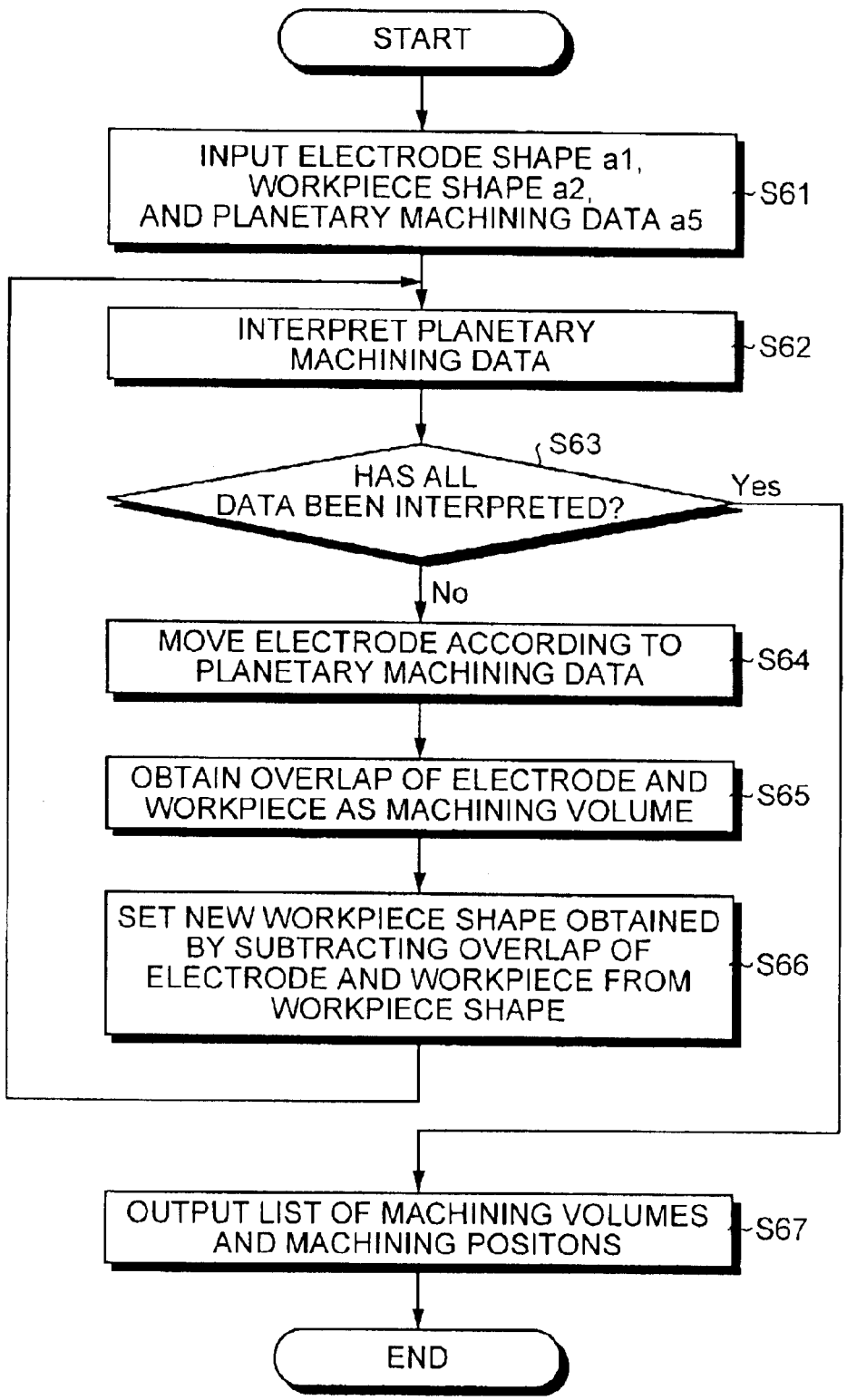
FIG. 14 is a flowchart of the operation of the machining simulation apparatus according to the fourth embodiment.

The operation the electric discharge machining apparatus 1 is explained below, with reference to the flowchart shown in FIG. 14.

First, a user inputs requirement specifications of an electrode shape a1, a workpiece shape a2, and planetary machining data a5 from the input section 61 (step S61). When receiving the requirement specifications from the input section 61, the planetary machining data interpreter 66 interprets the planetary machining data a5 (step S62), and sends the result thereof to the simulator 62a. The planetary machining data a5 represents conditions of the swinging of the electrode, and is, for example, data having contents of "circular swing, and swinging radius: 500 $\mu$m". Interpretation of the planetary machining data a5 stands for performing coordinate transformation processing for replacing the processing of "circular swing, and swinging radius: 500 $\mu$m" by xyz components as the processing as seen from the workpiece 10. The xyz components stand for a coordinate in each axis, when the height direction of the workpiece 10 is designated as the Z-axis direction, and axes orthogonal to each other within a plane perpendicular to the Z axis are designated as X axis and Y axis.

Thereafter, the planetary machining data interpreter 66 judges whether all the planetary machining data a5 has been interpreted (step S63). If all the planetary machining data a5 has not been interpreted (step S63, No), the simulator 62a simulates a machining state so that the electrode having the electrode shape a1 has been moved toward according to the electrode shape a1 and the workpiece shape a2 received from the input section 61, and the xyz components of the planetary machining data received from the planetary machining data interpreter 66 (step S64). The volume of overlap of the electrode shape a1 and the workpiece shape a2 is calculated as a machining volume in the coordinates (x, y, z) in which the position of the electrode shape a1 is coordinate-transformed (step S65). The simulator 62a sets the workpiece shape a2 at new one obtained by subtracting the overlap from the workpiece shape a2 (step S66). Here, the simulator 62a temporarily stores the work shape a1 and the machining volume in the coordinates (x, y, z) in which the position of the electrode shape a1 is coordinate-transformed. At this time, as explained in the first embodiment, the new workpiece shape a2 and a value of the machining volume in the coordinates (x, y, z) in which the position of the electrode shape a1 is coordinate-transformed may be displayed in the display 64.

Returning to step S62, the planetary machining data interpreter 66 interprets the planetary machining data a5, and performs processing of from step S62 to step S66, until there is no planetary machining data a5.

On the other hand, at step S63, when the planetary machining data interpreter 66 judges that all the planetary machining data a5 has been interpreted (S63, Yes), a list that consists of data rows each having the coordinate-transformed machining position and the machining volume, for example as shown in FIG. 15 is output to the display 64 (step S67). The user judges if the requirement specifications are appropriate based on the list displayed.

If the list (that is, the requirement specifications) is appropriate, the list is output from the output section 63a to the numerical control unit 4. The numerical control unit 4 controls the machining unit 2, the machining tank 5, and the power supply 3 based on the list. As a result the workpiece 10 is machined into a desired shape.

Also in this fourth embodiment, as explained in the second embodiment, the machining time estimating apparatus may be provided to calculate the machining time from the obtained machining volume, and display this in the display section 64. When the simulation is performed based on the planetary machining data, as explained in the third embodiment, it is also possible to perform simulation by a virtual electrode shape c1 obtained by adding the discharge gap a4 to the electrode shape a1.

According to this fourth embodiment, since the configuration is such that the data relating to the electrode shape, the work shape, and the swinging of the electrode are input, and the machined condition of the workpiece when the electrode is moved according to the swinging is simulated, more accurate machining volume suitable for actual machining can be calculated.

In the first to fourth embodiments, the machining time estimating apparatus (not shown) may be provided in the body of the electric discharge machining apparatus 1, or may be provided in the personal computer connected to the electric discharge machining apparatus 1, separately from the body of the electric discharge machining apparatus 1.

The shape of data output in the first to fourth embodiments is an example only, and the present invention is not limited thereto, and data format having the similar meaning may be used.

As explained above, according to this invention, the electric discharge machining apparatus comprises the machining simulation apparatus having: the input unit that inputs the shape of the electrode, the shape of the workpiece, and the machining depth of the workpiece; the simulation unit that calculates machining information relating to the machining shape at each machining depth, when the electrode is moved to the workpiece at a predetermined interval, until the input machining depth is obtained, based on the input shape of the electrode, the shape of the workpiece, and the machining depth of the workpiece, and sets a shape obtained by subtracting the machining shape from the shape of the workpiece as a new shape of the workpiece at each machining depth; and the output unit that outputs rows of machining area including the machining depth at each machining depth and machining information corresponding thereto. Therefore, there is the effect that variations in the shape of the workpiece with the progress of machining can be understood. As a result, since machining is carried out after having confirmed the simulation result, dispersion in machining conditions and machining time by the user can be eliminated. Further, the amount of energy has been heretofore adjusted during machining, and it is necessary to set safe conditions, in order to avoid a failure. However, in the present invention, since machining is carried out after having confirmed the simulation result, there is the effect that machining can be carried out under most suitable machining conditions.

According to the next invention, since the machining simulation apparatus further comprises the display unit that displays the new shape of the workpiece at each machining depth, there is the effect that variations in the work shape of the workpiece with the progress of machining can be displayed. Further, an input error of conditions by the user can be prevented.

According to the next invention, since the machining information is a machining area obtained by projecting a portion where the electrode shape and the shape of the workpiece overlap on each other in a plane perpendicular to the direction of the machining depth, there is the effect that an accurate machining area can be calculated, regardless of the electrode shape and the shape of the workpiece.

According to the next invention, since the machining simulation apparatus further comprises the display unit that displays a machining area of the workpiece at each machining depth, there is the effect that an accurate machining area can be calculated, regardless of the electrode shape and the shape of the workpiece, and the information can be presented to the user. Further, an input error of conditions by the user can be prevented based on the information.

According to the next invention, since the machining information is a machining volume of the portion where the electrode shape and the shape of the workpiece overlap on each other, there is the effect that an accurate machining volume can be calculated, regardless of the electrode shape and the shape of the workpiece.

According to the next invention, the electric discharge machining apparatus comprises the machining simulation apparatus having: the input unit that inputs the shape of the electrode, the shape of the workpiece, and data relating to the machining program; the simulation unit that calculates machining information relating to the machining shape of the workpiece, when the electrode is moved to the workpiece according to the machining program, based on the input shape of the electrode, the shape of the workpiece, and the machining program, and sets a shape obtained by subtracting the machining shape from the shape of the workpiece as a new shape of the workpiece at each electrode position; and the output unit that outputs rows of machining information including each electrode position and machining information corresponding thereto. Therefore, there is the effect that variations in the shape of the workpiece with the progress of machining can be understood, even when the electrode is operated according to the program, for example, when the electrode operation such as swinging machining is taken into consideration. As a result, since machining is carried out after having confirmed the simulation result, dispersion in machining conditions and machining time by the user can be eliminated. Further, the amount of energy has been heretofore adjusted during machining, and it is necessary to set safe conditions in order to avoid a failure. However, in the present invention, since machining is carried out after having confirmed the simulation result, there is the effect that machining can be carried out under most suitable machining conditions.

According to the next invention, since the machining simulation apparatus further comprises the display unit that displays the new shape of the workpiece at each electrode position moved according to the machining program, there is the effect that variations in the work shape of the workpiece with the progress of machining can be displayed. Further, an input error of conditions by the user can be prevented.

According to the next invention, since the machining information is a machining volume of the portion where the electrode shape and the shape of the workpiece overlap on each other at each electrode position moved according to the machining program, there is the effect that an accurate machining volume can be calculated, regardless of the electrode shape and the shape of the workpiece.

According to the next invention, since the machining simulation apparatus further comprises the virtual electrode creating unit that creates a virtual electrode shape by adding an optional offset quantity to the electrode shape input by the input unit, there is the effect that the machining conditions of the workpiece can be determined, by the conditions most suited to the actual machining condition where a discharge gap exists in the electrode shape.

According to the next invention, since the electric discharge machining apparatus further comprises the machining time estimating unit that estimates the machining time of the workpiece from the machining conditions output from the output unit, there is the effect that accurate machining time required for obtaining a desired shape of the workpiece can be presented, together with the simulation of the workpiece.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An electric discharge machining apparatus comprising:
   a machining tank in which a workpiece is placed for machining;
   a machining unit that has an electrode for electric discharge machining of the workpiece;
   a power supply unit that supplies a voltage between the electrode and the workpiece;
   a numerical control unit that controls the machining unit and the machining tank, according to a machining program for electric discharge machining of the workpiece;
   an input unit for inputting shape of the electrode, shape of the workpiece, and a machining depth to which the workpiece is to be machined;
   a simulation unit that calculates machining information relating to the machining shape at each simulated machining depth, when the workpiece is machined with the electrode to a predetermined depth, until the machining depth input is reached, based on the shape of the electrode, the shape of the workpiece, and the machining depth of the workpiece, and determines the shape obtained by subtracting the machining shape simulated from the shape of the workpiece, as a new shape of the workpiece, at each simulated machining depth; and
   an output unit that outputs a list of data rows, each data row having the simulated machining depth and the machining information corresponding to the simulated machining depth.

2. The electric discharge machining apparatus according to claim 1, further comprising a display unit that displays the new shape of the workpiece at each simulated machining depth.

3. The electric discharge machining apparatus according to claim 1, wherein the machining information is machining area obtained by projecting overlap of the electrode shape and the shape of the workpiece in a plane perpendicular to the simulated machining depth.

4. The electric discharge machining apparatus according to claim 3, further comprising a display unit that displays a machining area of the workpiece at each simulated machining depth.

5. The electric discharge machining apparatus according to claim 1, wherein the machining information is machining volume of overlap of the electrode shape and the shape of the workpiece.

6. The electric discharge machining apparatus according to claim 1, further comprising a virtual electrode creation unit that creates a virtual electrode shape by adding an optional offset quantity to the electrode shape input, wherein the simulation unit calculates the machining information relating to the simulated machining shape of the workpiece, using the virtual electrode shape.

7. The electric discharge machining apparatus according to claim 1, further comprising a machining time estimating unit that estimates machining time of the workpiece from the list output from the output unit.

8. An electric discharge machining apparatus comprising:
   a machining tank in which a workpiece is placed for machining;
   a machining unit that has an electrode for electric discharge machining of the workpiece;
   a power supply unit that supplies a voltage between the electrode and the workpiece;
   a numerical control unit that controls the machining unit and the machining tank, according to a machining program for electric discharge machining of the workpiece;
   an input unit for inputting shape of the electrode, shape of the workpiece, and data relating to the machining program;

a simulation unit that calculates machining information relating to each simulated machining shape of the workpiece, when the workpiece is machined with the electrode according to the machining program, based on the shape of the electrode, the shape of the workpiece, and the machining program, and determines the shape obtained by subtracting the simulated machining shape from the shape of the workpiece, as a new shape of the workpiece, at each electrode position; and an output unit that outputs a list of data rows, each data row having the electrode position and machining information corresponding the electrode position.

9. The electric discharge machining apparatus according to claim 8, further comprising a display unit that displays the shape of the workpiece at each electrode position according to the machining program.

10. The electric discharge machining apparatus according to claim 8, wherein the machining information is machining volume of overlap of the electrode shape and the shape of the workpiece at each electrode position moved according to the machining program.

11. The electric discharge machining apparatus according to claim 8, further comprising a virtual electrode creation unit that creates a virtual electrode shape by adding an optional offset quantity to the electrode shape input by the input unit, wherein the simulation unit calculates the machining information relating to the machining shape of the workpiece, using the virtual electrode shape.

12. The electric discharge machining apparatus according to claim 8, further comprising a machining time estimating unit that estimates machining time of the workpiece from the list output from the output unit.

13. An electric discharge machining simulator comprising:

an input unit for inputting shape of a machining electrode, shape of a workpiece to be machined, and machining depth to which the workpiece is to be machined by the machining electrode;

a simulation unit that calculates machining information relating to the machining shape at each simulated machining depth, when the workpiece is machined with the electrode to a predetermined depth, until the machining depth input is reached, based on the shape of the electrode, the shape of the workpiece, and the machining depth of the workpiece, and determines the shape obtained by subtracting the machining shape simulated from the shape of the workpiece, as a new shape of the workpiece, at each simulated machining depth; and an output unit that outputs a list of data rows, each data row having the simulated machining depth and the machining information corresponding to the machining depth simulated.

* * * * *